Figure 1:
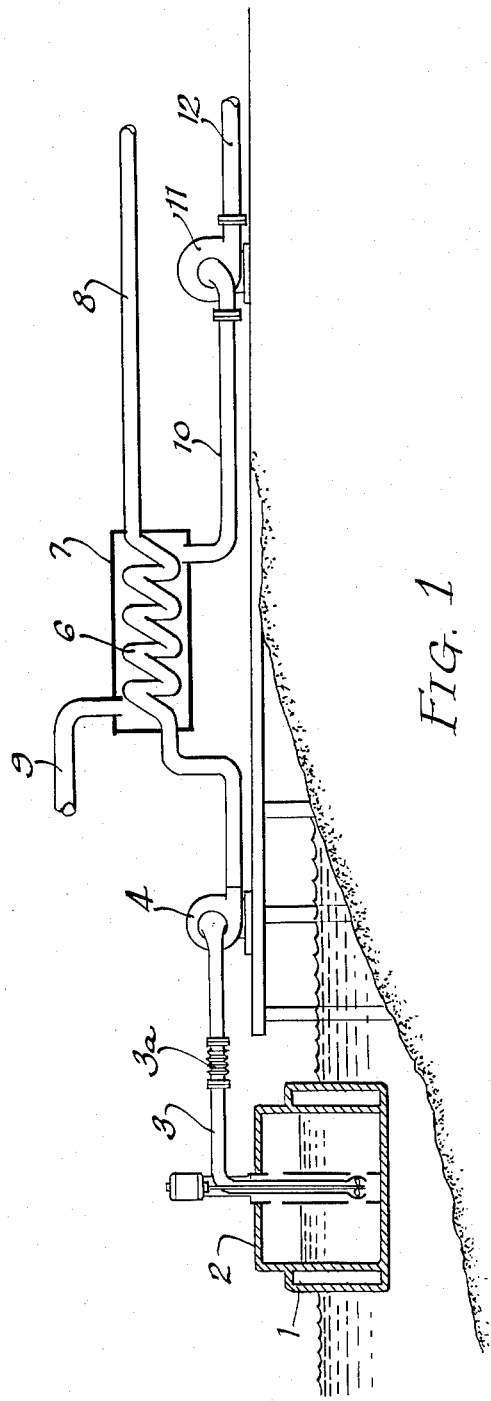

March 21, 1961 W. L. MORRISON 2,975,608
TRANSPORTATION AND USE OF LIQUEFIED NATURAL GAS
Filed July 1, 1957 2 Sheets-Sheet 1

INVENTOR.
Willard L. Morrison
BY Ooms, McDougall,
Williams & Hersh
Attorneys

INVENTOR.
Willard L. Morrison

United States Patent Office 2,975,608
Patented Mar. 21, 1961

2,975,608

TRANSPORTATION AND USE OF LIQUEFIED NATURAL GAS

Willard L. Morrison, Lake Forest, Ill., assignor, by mesne assignments, to Conch International Methane Limited, Nassau, Bahamas, a corporation of the Bahamas Filed July 1, 1957, Ser. No. 669,194

4 Claims. (Cl. 62—53)

This invention relates to the utilization of liquefied natural gas for the synthesis of such compounds as ammonia and the like and further the utilization of the refrigeration available in such liquefied natural gas for maintaining refrigerated conditions in the storage and transportation means whereby it becomes commercially possible economically and efficiently to transport natural gas over great distances from a source of plentiful supply to an area lacking in adequate supply of natural gas.

It relates further to a method applicable to the synthesis of ammonia, urea and the like materials either for achieving a reduction in cost for the manufacture thereof or to increase the capacity of the facilities used in the manufacture thereof, thus making it possible not only to utilize the value of the liquefied natural gas as a raw material in the synthesis but also to make use of the value of the liquefied natural gas as a source for the supply of power and refrigeration.

This application is a continuation-in-part of application Ser. No. 451,655, filed on August 23, 1954, now abandoned, and entitled "Method and Apparatus for Employing Natural Gas in an Ammonia Producing Process and the Like."

Liquefied methane, the major component of natural gas, is frequently used as one of the raw materials in the production by synthesis of anhydrous ammonia and the like. Air is also used as one of the raw materials in the process and as one of the steps in its preparation for such use, it may be liquefied. I propose, in order to reduce the pressures required in the various stages of the production of such a material as anhydrous ammonia in order to reduce especially the requirement of horsepower and expense involved in liquefying the air, that liquefied methane be used as a coolant in connection with the liquefaction of air by heat exchange or other means whereby either the cold liquefied methane at —258° F. or the cold gas boiled off from the liquefied methane at about but slightly above that temperature will be used to furnish cooling effects necessary to produce the liquefied air.

I also propose to use the cold liquefied methane or the cold gas boiled off from the liquefied methane as a refrigerant in connection with a cooling unit or ammonia condenser or both into which the gases flow from the synthesis chamber or ammonia converter. In the event that the refrigerating effect of that amount of liquefied methane required as a raw material in a particular plant were insufficient to provide all of the refrigeration effect needed, additional cold liquefied methane can be vaporized in the plant for use as a fuel in the plant or elsewhere. Until the liquid has been vaporized, returned to its gaseous phase and warmed to a point where it can be used as a fuel, it is not available for any use except as a refrigerant and its use as a refrigerant is a convenient and effective way in which the methane in gaseous phase can be economically obtained from the cold liquid made available for use.

For example, the machinery operating in the plant including compressors, conveyors and other working machinery, as well as lighting, may be powered by use of the gaseous methane as a fuel. If desired, the liquefied methane which must be in a gaseous phase for use outside of the plant as a fuel can be warmed in the plant as a part of the operation.

In this connection, it is important to note that the liquid methane, as a part of the transformation from liquid to gas, with its used in that connection as a refrigerant, can well take place with the generation of power before combustion, as for example by heat exchange. Regeneration of the liquefied natural gas in a boiler will enable the generation of gas pressures which may be used to drive a turbine or an engine somewhat in the same manner in which steam is employed.

Since, when methane is used as one of the raw materials in such a synthesis process, it must frequently be supplied to the system at high pressure, the liquefied methane will be vaporized in a heat exchanger which is heated by gas or liquid at lower temperatures from some other part of the synthesis cycle or even from outside the system.

An important concept of this invention, therefore, lies in the use of this liquefied natural gas as a raw material, as a coolant in connection with the liquefaction of air, as a coolant in connection with the synthesis of the materials being developed, in the generation of power before combustion, in the generation of power as the result of combustion, and in the use of natural gas not needed as a raw material as the fuel for space heating or the generation of power.

While it is known to liquefy methane or natural gas in small quantities for laboratory purposes and while the shipment of such liquefied gas at low pressures has been suggested, I propose to supply tonnage quantities of liquefied natural gas, as will hereinafter be described, to a synthesis plant at —258° F. and at about atmospheric pressure. The liquefied gas will serve as a raw material, as a source of cold or refrigeration, as a source of power and as a fuel. Thus the supply of liquefied natural gas at atmospheric pressure and at —258° F. will be advantageous and effect a savings which may be generally summarized as follows:

(1) An ammonia plant can obtain a supply of natural gas without the necessity of its being located on a pipe line or having a pipe line run especially to it because it will receive the necessary quantity of natural gas by water transportation in liquefied form.

(2) The liquefied natural gas at —258° F. can be pressurized to levels required in the plant processes by pumping it as a liquid into a vessel which functions as an evaporator wherein the liquefied natural gas is vaporized to the desired pressure, while concurrently utilizing heat of vaporization for refrigeration in the process of synthesizing ammonia or in the liquefaction of other gases.

(3) The liquefied natural gas can be used as a source of refrigeration for liquefying air or other gases for the purpose of obtaining nitrogen and oxygen that may be used in the ammonia synthesis.

(4) A water cooled condenser is commonly employed to cool the gases flowing from an ammonia converter for purposes of driving the equilibrium in the direction of the ammonia synthesis and to condense ammonia. The refrigeration effect from liquefied natural gas can be utilized further to cool the effluent stream of ammonia vapor and unconverted gases from the water cooled condenser, thereby making possible the effective separation of the anhydrous ammonia at a lower pressure, which would enable operation of the ammonia converter at reduced pressure. The unconverted gases are thereafter commonly recycled through the converter.

(5) The liquefied natural gas, ultimately to be used as a fuel, provides an additional refrigeration effect which can be applied to ammonia or urea synthesis or to other requirements for refrigeration as in the liquefaction of air, oxygen and other gases.

(6) The refrigerating effect of the liquefied natural gas supplied to an ammonia or urea plant as a processed raw material and as a fuel may also advantageously be applied to the liquefaction of ammonia for storage processes at atmospheric pressure at a temperature of about −28° F.

(7) The refrigeration effect of the liquefied natural gas can be utilized further to reduce the power required to compress the nitrogen and hydrogen to the high pressures necessary for the ammonia synthesis converter by refrigerating and reducing the temperature of the synthesis gases entering the compression equipment.

A further object of this invention is to make more efficient utilization of the refrigeration characteristics available in the liquefied natural gas and which is made available from the conversion of the liquefied natural gas from the liquefied state to the gaseous state at elevated temperature, in reducing the cost of operations for the transportation of natural gas from a source of plentiful supply to an area wherein a deficiency of natural gas exists, to conserve the equipment employed in the transportation of liquefied natural gas over distant stations, and to make available at the source of supply a cold boiling component which is liquefied responsive to the reduction of the cold boiling liquefied natural gas from a liquefied state to a gaseous state at elevated temperatures at the point of use.

These and other objects and advantages of this invention will hereinafter appear and for purposes of illustration, but not of limitation, an embodiment of this invention is shown in the accompanying drawings in which—

Figure 2:
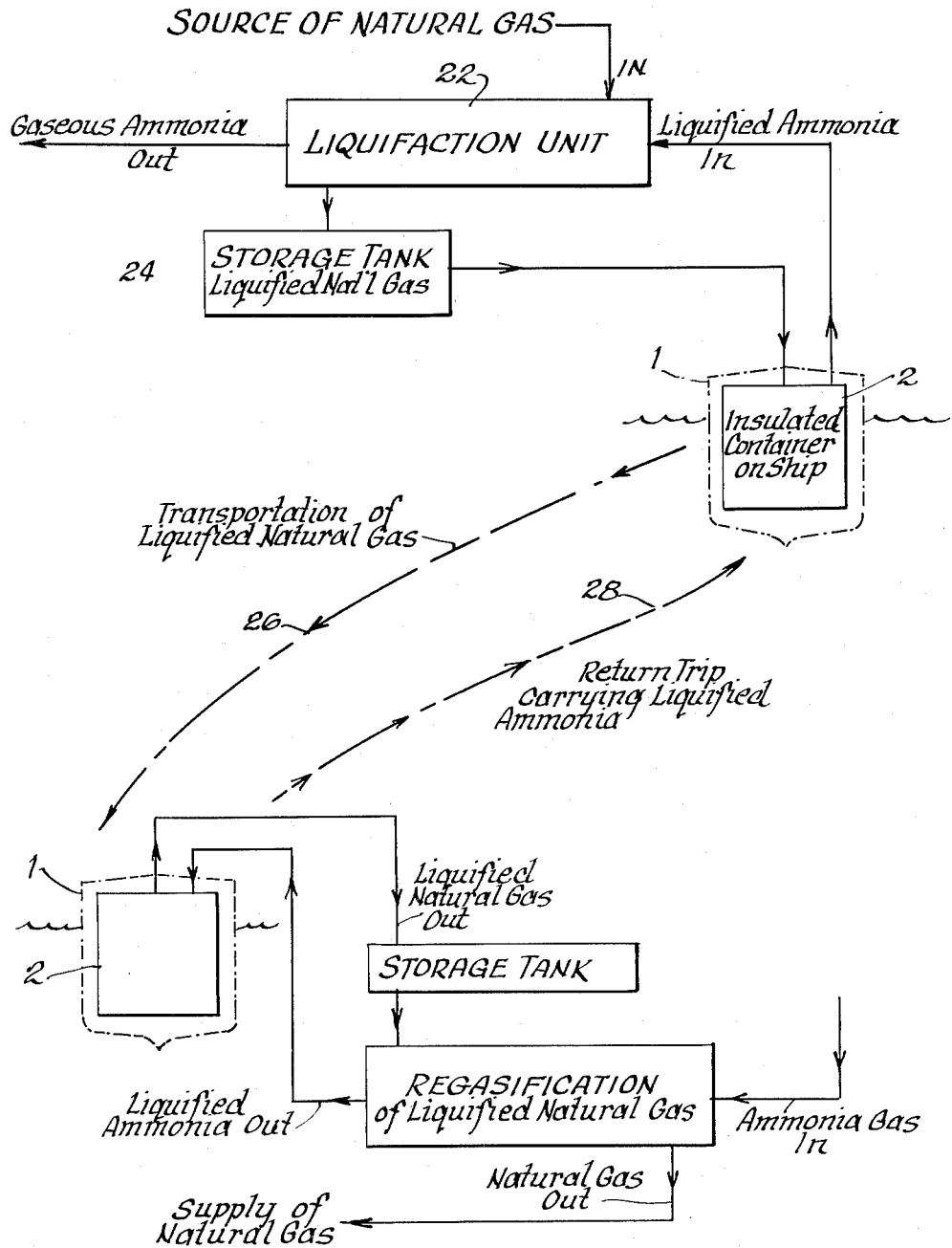

Figure 1 is a flow sheet illustrating the application of the liquefied natural gas in the synthesis of ammonia, and Figure 2 is a flow diagram showing the combination of steps for the economical transportation of liquefied natural gas from a source of supply to a point of use and for the conservation of equipment and materials employed therein.

A transport barge 1 carries an insulated liquefied natural gas tank 2 adapted to contain many tons of the liquid at about −258° F. In utilization of the liquefied natural gas at the point of use, the barge is tied up at a dock near the synthesis plant. The liquefied gas is discharged at low pressure by a suitable means, such as a motor and pump assembly 2ᵃ, not further here illustrated as they form no essential part of the present invention. The liquefied natural gas is discharged from the insulated tanks through a duct 3 to a liquefied natural gas pump 4 which discharges the cold boiling gas through the liquid gas heat exchange coil 6 in heat exchanger or gas vaporizer 7.

The vaporized gas at high pressure is discharged from the heat exchanger through pipe 8 for use as a raw material in the plant, or as a fuel, or otherwise to furnish power. Being still at a relatively low temperature, the gas may also be used as a refrigerant in the synthesis plant where such use is needed.

The numeral 9 refers to a pipe through which low pressure, processing air or vapor or gas at relatively high temperature enters the heat exchanger or vaporizer 7 to be lowered in temperature while at the same time exchanging heat necessary to vaporize the liquefied natural gas in the coil 6. Low pressure cold process air, vapor or other gases are led to the compressor 11 through pipe 10 from the heat exchanger 7 for compression at 11 for supply as high pressure air, gas or vapor at reduced temperature. The liquefied gas supplied to the plant from the barge at −258° F. thus furnishes refrigeration, motive or propulsive power, fuel value, and also serves as a process raw material.

The liquefaction of the air, ammonia or other vapors can be achieved by the cascade process utilizing the refrigeration available in the liquefied natural gas further to reduce the temperature of the compressed air, ammonia or other gas to achieve a liquefied state. Liquefaction of such other gases may instead be achieved by a process of expansion of the cold compressed gases to about atmospheric pressure while doing work thereby to achieve additional cooling.

To the present, description has been made of the utilization of the liquefied natural gas as a source of power to operate processing equipment, as a source of cold for the condensation and liquefaction of other processed or synthesized gases passed in heat exchange relation therewith, as a source of fuel in its vaporized state for the generation of heat and power, and as a raw material in its vaporized state in the synthesis of ammonia, urea and the like compounds.

While it is important, from the standpoint of commercial practice, to make fullest utilization of the elements present in the liquefied natural gas upon conversion from the liquefied state to a gaseous state at elevated temperatures, there are additional factors which have been found materially to influence the economics of this new program.

Without question, the supply of natural gas from areas having an excess to areas having a deficiency would beneficially increase the welfare of both areas because income would be derived from a raw material otherwise wasted while a fuel for the generation of power and heat for industrialization and living would be made available in other areas lacking in such raw materials. By way of an illustration, using the welfare of nations, Venezuela is oversupplied with natural gas to the extent that substantial amounts of this important fuel are wasted. On the other hand, Great Britain, a well recognized industrial nation, is slowly deteriorating in industrial capacity because of its lack of fuel and because of the high cost of fuel manufactured of coal present in Great Britain as a limited natural resource. The same applies to an equal extent in others of the European countries and even in sections of the United States which cannot economically be reached by pipe lines and the like.

In this new and important industrial development, the natural gas at its source will be reduced to a liquefied state so that it will permit easier handling in transportation in volumes $1/600$ of its volume in the gaseous state. In order to transport the liquefied natural gas economically over distant routes, it is essential to make use of receivers of large capacity, otherwise the cost of construction and operation of the containers would render the system uneconomical. Containers of large capacity cannot be constructed strong enough to withstand the pressures existing if the liquefied natural gas were to be contained at atmospheric temperature. As a result, it becomes necessary to calculate for the transportation of the liquefied natural gas in large volume at about atmospheric pressure. The critical temperature for liquefied natural gas consisting mostly of methane is about −258° F. at atmospheric pressure. When the liquefied natural gas is sweetened with as much as 10 percent by weight higher boiling hydrocarbons, the vaporization temperature at atmospheric pressure can be reduced to about −240° F.

Thus transportation of liquefied natural gas in large volumes requires the maintenance of temperature conditions in the order of −240° F. to −258° F. To accomplish this, the liquefied natural gas is housed during storage and transportation in a tank 2 of large capacity having a substantial amount of insulation 20 to minimize the transmission of heat from the atmosphere to the liquefied natural gas. Even then some heat is transferred through the insulation and the walls of the tank into the liquefied natural gas to cause some evaporation. The amount evaporated can be used as a fuel for power to drive the ship 1 or other transportation means thereby to make economical utilization of the vapors otherwise lost. In the alternative, the released vapors can be re-liquefied by on-ship liquefaction for return to the tanks.

One of the factors which has been found to be quite important to the economical reduction to practice of this industry resides in the ability to keep the transportation ship moving between the source of supply to the area of use with minimum tie-up of the ship at the docks for loading or unloading. Another factor resides in the ability to load and unload the natural gas without excessive loss of natural gas by vaporization.

When a ship 1 is placed into service, it has been found to require a number of days properly to cool down the tanks 2 for the introduction of liquefied natural gas at a temperature of −258° F. If the liquefied natural gas at −258° F. is loaded too rapidly into the tanks for filling without proper cool-down, the sudden exposure of the tank to higher temperatures causes such strain and stress conditions to develop within the elements of the tank as to cause rapid and immediate deterioration with the result that a large investment can be dissipated. Extremely dangerous conditions will be caused to develop because of the inability of the steel sections of the ship and tanks to withstand the temperatures of the liquefied natural gas.

Aside from these structural limitations, the amount of vapor suddenly released upon exposure of the liquefied natural gas to the higher temperatures of the elements in the tank will cause vapors to rush under pressure from the tank in amounts incapable of being handled. As a result, an uncontrolled and dangerous condition will be caused to exist leading not only to loss of considerable amounts of natural gas but also to the development of pressures incapable of being tolerated by the structural units. The cold natural gas exploding or otherwise rushing uncontrolled from the tank would be unsafe for men or equipment and would be banned by the Coast Guard regulations.

In the present practice, the tanks of the ship are processed upon return to port by spraying liquefied natural gas at a low rate onto the walls of the tank to effect cool down at a slow and controlled rate and at a rate at which the vapors released can be utilized for re-liquefaction in part within the capacity of the re-liquefaction plant or for the disposal of the remainder in an orderly fashion. This still requires a substantial amount of time for cool down and considerable amounts of vaporized gas is beyond recovery.

Further, the periodic cycle of increase in the temperature of the tank during its return empty from the area of use to the source of supply and the rapid decrease in the temperature of the tank upon loading with the liquefied natural gas causes fatigue and other deteriorating effects on the elements which make up the storage tank and such frequencies in temperature conditions materially affect the useful life of the tank. Ordinarily, such fatigue or deterioration would not be objectionable but, when the tanks form a part of a large tanker or ship, the time and cost for replacement or repair becomes a material factor.

Thus an important concept of this invention resides in the maintenance of conditions whereby the time consumed for cool down of the tank is materially reduced and wherein the amount of liquefied natural gas vaporized for filling is minimized to the extent that the amount of gas vaporized is at a minimum and at a rate which can easily be controlled for re-use, re-liquefaction, or for otherwise disposing of the vapors that are formed. The concept described is achieved by the conservation of the refrigeration available in the liquefied natural gas to minimize heating up of the tanks during the return voyage from the area of use to the source of supply thereby to maintain controlled refrigerated conditions in the tanks.

This not only eliminates the temperature cycle described but it maintains the tanks at a temperature whereby cool down is eliminated or greatly minimized with consequent savings in the tie-up of the ship in port and corresponding reduction in the amount of liquefied natural gas vaporized and in the rate of its vaporization.

In accordance with the practice of the described concept, the cold released from the liquefied natural gas for reduction of the liquefied gas from its liquid phase to a gaseous phase for use is utilized to provide the cold for maintaining the tanks in the desired refrigerated state during the return voyage so that the tanks arrive at the source of supply in a cold condition which requires little cool down and thereby reduces the time for conditioning of the tanks for filling while concurrently reducing the amount and rate of vaporization of liquefied natural gas during the cool down period. Utilization of the refrigeration which would otherwise be wasted in reconversion of the liquefied natural gas to maintain the tanks in a refrigerated state also reduces the fluctuation in temperatures to which the tanks are subjected from delivery to return voyages.

In practice, the natural gas, composed chiefly of methane, is reduced at or near its source to a liquefied state as by means of an expansion or cascade cycle, as represented by the numeral 22 in the flow diagram. The liquefied natural gas is accumulated in storage facilities, such as tanks 24, until a transportation ship 1 fitted with large insulated tanks 2 arrives for loading the liquefied gas for transportation to distant points where a deficiency of natural gas exists.

The liquefied natural gas at atmospheric pressure and at about −258° F. is introduced slowly into the ship's tanks 2 by spraying onto the walls of the insulated tanks whereby initial portions of the liquefied gas vaporize upon exposure to the elevated temperatures existing in the tanks concurrently to cause cool down of the tanks. Thus the tanks are slowly cooled down to a level whereby the introduction of the liquefied natural gas can be carried out at a rapid rate to fill the tanks. After cool down, the tanks, each having a capacity which may be in order of 10,000 barrels or more, can be filled in a matter of hours to ready the ship for embarkation and delivery of the liquefied natural gas to distant stations.

During transportation, indicated by the broken line 26, the vapors released upon absorption of heat from the atmosphere can be used as a fuel to power the driving means or else the released vapors can be re-liquefied for return to the tanks. When filled or partially filled, the tanks will be maintained at a temperature of about −240° F. to −258° F. corresponding to the temperature of the liquefied natural gas contained therein.

Upon arrival at the distant point of use, the liquefied natural gas will be displaced from the ship's tanks 2, as by means of pumps, to storage tanks on the shore. Re-conversion of the liquefied natural gas releases power and cold which can be used, as previously described, for the synthesis and liquefaction of other gases such as ammonia, air, nitrogen or the like materials which are readily available at the area of use. The liquefied other gases will have a boiling point temperature at atmospheric pressure which approximates that of the liquefied natural gas. These other liquefied gaseous materials can be produced as described as the liquefied natural gas in storage is being used.

When the tanks of the ship have been unloaded in the matter of hours required to effect displacement from ship to shore storage facilities, the other liquefied gas on shore can immediately be introduced into the ship's tanks before any substantial amount of heating up has taken place. Thus the tanks can be filled with a liquefied cold boiling gas which preferably is to be retained at the source of natural gas supply thereby to provide a return cargo for most efficient utilization of the ship's space.

More important to the concepts embodying the features of this invention, a cold liquefied gas will remain in the tanks to permit substantially complete removal of the liquefied natural gas from the tanks without material change in the temperature of the tanks throughout the cycle.

When the tanks filled with the other cold boiling liquefied gas returns to the source of supply of natural gas, as indicated by the route 28, the other liquefied gas can be pumped out in a matter of hours to lend storage for use. When relieved of their load, the insulated ship's tanks can be refilled with the liquefied natural gas in storage for another cycle of operations.

Because the tanks are maintained in a cold state throughout the return voyage 28, little if any deviation in temperature will take place in the insulation and in the tank structure with the result that the periodic cycle can be carried out without substantial temperature changes with material beneficial effect on the stability and life of the ship and the ship's tanks. Maintenance of the tanks in a refrigerated state during the return voyage will eliminate the necessity of utilizing a considerable amount of time for cooling down the tanks prior to filling and it will greatly minimize the amount of natural gas which otherwise would be wasted.

Thus the steps described are effective in combination to place less strain on the ship and the ship's tanks in use throughout the process. The steps described operate in combination materially to cut down the time required to load the ship at the source of supply for natural gas. The described steps operate in combination markedly to reduce the amount of vapors required to be reprocessed and the amount of vapors otherwise lost in the loading operation. Further, it makes available at low cost another gas which otherwise would require synthesis at the source of supply of natural gas. Finally, it makes fuller utilization of the forces released from the liquefied natural gas during the re-gasification cycle.

While inventive concepts have been described with reference to the synthesis of ammonia wherein the liquefied natural gas is used as a raw material and wherein the liquefield natural gas is used as a source of power, as a source of cold, and as a source of fuel, it will be apparent that in the concepts for the protection of the ship's tanks and structure and for the conservation of gas and time, other liquefied low boiling gases may be employed in the process.

It will be understood that numerous changes may be made in the details of construction, arrangement and operation without departing from the spirit of the invention, especially as defined in the following claims.

I claim:

1. In the method of processing natural gas, consisting essentially of methane, available from a source of supply for use at a distant station lacking such supply by reducing the natural gas to a liquefield state at the supply source, transporting the natural gas in its liquefied state in insulated receivers of large capacity while at atmospheric pressure and at a temperatur of about —258° F. to a distint station for use, the steps of withdrawing the liquefield natural gas from the insulated receiver when at the station of use, passing the liquefield natural gas in heat exchange relation with another gas to convert the liquefied gas to the gaseous state for use while concurrently recovering the refrigeration invested in the liquefied natural gas for liquefaction of the other gas passed in heat exchange relation therewith, discharging the vaporized natural gas for use, discharging the liquefied other gas when in the form of an inert gas selected from the group consisting essentially of ammonia and nitrogen into the insulated receivers for use in retaining the temperature in the receivers during the return voyage while also making such other gas and its refrigeration available for use at the supply source for the natural gas.

2. The method as claimed in claim 1 in which said other gas is ammonia.

3. The method as claimed in claim 1 in which the refrigeration is recovered from the liquefied natural gas for transmission to the other gas through a refrigeration medium which is passed in heat exchange relationship with the liquefied natural gas to extract the refrigeration therefrom while converting the liquefied natural gas to the gaseous state and wherein the refrigerating medium is subsequently passed in heat exchange relationship with the other gas to transfer the refrigeration of the natural gas to said other gas.

4. The method as claimed in claim 1 which includes the step of burning the revaporized natural gas as a fuel.

References Cited in the file of this patent

UNITED STATES PATENTS

| | | |
|---|---|---|
| 2,040,059 | Mesinger | May 5, 1936 |
| 2,682,154 | Wilkinson | June 29, 1954 |
| 2,783,624 | Morrison | Mar. 5, 1957 |
| 2,799,997 | Morrison | July 23, 1957 |

FOREIGN PATENTS

| | | |
|---|---|---|
| 736,736 | France | Sept. 21, 1932 |